(12) United States Patent
Bernard et al.

(10) Patent No.: US 12,258,136 B2
(45) Date of Patent: Mar. 25, 2025

(54) AIRSHIP EQUIPPED WITH AN ELECTRIC DISTRIBUTED PROPULSION SYSTEM

(71) Applicant: Flying Whales, Suresnes (FR)

(72) Inventors: Jacques Bernard, Metz (FR); Benoît Le Blanc, Paris (FR)

(73) Assignee: Flying Whales, Suresnes (FR)

( * ) Notice: Subject to any disclaimer, the term of this patent is extended or adjusted under 35 U.S.C. 154(b) by 99 days.

(21) Appl. No.: 18/258,301

(22) PCT Filed: Dec. 17, 2021

(86) PCT No.: PCT/FR2021/052377
§ 371 (c)(1),
(2) Date: Jun. 19, 2023

(87) PCT Pub. No.: WO2022/129811
PCT Pub. Date: Jun. 23, 2022

(65) Prior Publication Data
US 2024/0051672 A1    Feb. 15, 2024

(30) Foreign Application Priority Data
Dec. 18, 2020   (FR) ........................ 2013690

(51) Int. Cl.
*B64B 1/32*     (2006.01)
*B64D 27/24*    (2024.01)
(Continued)

(52) U.S. Cl.
CPC ................ *B64D 27/24* (2013.01); *B64B 1/32* (2013.01); *B64D 27/35* (2024.01); *H02J 4/00* (2013.01);
(Continued)

(58) Field of Classification Search
CPC .... B64D 27/24; B64D 27/35; B64D 2221/00; B64D 27/357; B64D 35/024;
(Continued)

(56) References Cited

U.S. PATENT DOCUMENTS

| 4,269,375 A | 5/1981 | Hickey |
| 2012/0273608 A1 | 11/2012 | Jess et al. |

(Continued)

FOREIGN PATENT DOCUMENTS

| EP | 2243700 A2 * | 10/2010 | ............. B63H 25/42 |
| EP | 3318492 A1 | 5/2018 | |

(Continued)

OTHER PUBLICATIONS

Japanese Office Action for Application No. 2023-537337 dated Jun. 11, 2024, 7 pages with machine translation.

(Continued)

*Primary Examiner* — Elim Ortiz
(74) *Attorney, Agent, or Firm* — TraskBritt

(57) ABSTRACT

An airship comprises a plurality of electric power generators; a plurality of electrical buses; and a plurality of propulsion points each equipped with a propellant bundle formed from a plurality of thrusters of the electric-motor-driven propeller type. For each of the propulsion points, a thruster is electrically connected to one of the generators by way of one of the electrical buses, and another thruster of the propulsion point is electrically connected to another of the generators by way of another of the electrical buses.

8 Claims, 4 Drawing Sheets

(51) Int. Cl.
*B64D 27/35* (2024.01)
*H02J 4/00* (2006.01)

(52) U.S. Cl.
CPC ....... *B64D 2221/00* (2013.01); *H02J 2310/44* (2020.01)

(58) Field of Classification Search
CPC .... B64D 35/026; B64D 41/00; B64D 27/026; B64B 1/32; B64B 1/34; H02J 4/00; H02J 2310/44; Y02T 50/60; Y02T 50/50; Y02E 60/50
USPC .......... 244/26, 12.2, 125, 127, 30; 192/55.6; 49/360
See application file for complete search history.

(56) References Cited

U.S. PATENT DOCUMENTS

| | | | | |
|---|---|---|---|---|
| 2017/0203839 | A1* | 7/2017 | Giannini | B64D 27/24 |
| 2018/0022461 | A1* | 1/2018 | Nunes | B64D 27/24 244/26 |
| 2018/0065739 | A1* | 3/2018 | Vondrell | B64D 27/24 |
| 2018/0065742 | A1* | 3/2018 | Vondrell | B64D 27/24 |
| 2019/0241274 | A1* | 8/2019 | Hunkel | H02J 7/345 |
| 2019/0384288 | A1* | 12/2019 | Gu | G05D 1/0816 |
| 2020/0164995 | A1* | 5/2020 | Lovering | B64U 10/20 |

FOREIGN PATENT DOCUMENTS

| | | |
|---|---|---|
| EP | 3521172 A1 | 8/2019 |
| GB | 2497136 A | 6/2013 |
| JP | 5515359 B2 | 6/2014 |
| WO | 2020/190223 A1 | 9/2020 |
| WO | 2020/190233 A2 | 9/2020 |

OTHER PUBLICATIONS

International Search Report for International Application No. PCT/FR2021/052377 dated Mar. 24, 2023, 3 pages.
International Written Opinion for International Application No. PCT/FR2021/052377 dated Mar. 24, 2023, 5 pages.

* cited by examiner

AIRSHIP EQUIPPED WITH AN ELECTRIC DISTRIBUTED PROPULSION SYSTEM

CROSS-REFERENCE TO RELATED APPLICATIONS

This application is a national phase entry under 35 U.S.C. § 371 of International Patent Application PCT/FR2021/052377, filed Dec. 17, 2021, designating the United States of America and published as International Patent Publication WO 2022/129811 A1 on Jun. 23, 2022, which claims the benefit under Article 8 of the Patent Cooperation Treaty of French Patent Application Serial No. FR2013690, filed Dec. 18, 2020.

TECHNICAL FIELD

The present disclosure relates to an electrical distributed propulsion system for a hover-capable aircraft. It further relates to a hover-capable aircraft equipped with such a system, more particularly an airship bearing heavy loads.

BACKGROUND

Usually, a propulsion system in an aircraft comprises two electrical power generation units and two main electrical buses, each being connected to one of the two electrical power generation units. Downstream, the propulsion system comprises a plurality of thrusters, each of the thrusters being connected, in a nominal configuration to one of the two electrical buses. This is, for example, the case of certain multi-rotor and vertical-takeoff aircraft.

According to a nominal configuration, the right propulsion point of an aircraft is, for example, electrically connected to a power generation unit located on the right side of the aircraft, while the left propulsion point of the aircraft is, for example, electrically connected to a power generation unit located on the left side of the aircraft.

For redundancy reasons, an electrical reconfiguration step is provided for the case where one of the two power units has a defect. For example, a possible electrical reconfiguration is provided to power the left motor from the generation unit located on the right in the event of a fault in the generation unit located on the left. To this end, a backup electrical circuit must be provided connecting the left motor to the generation unit located on the right. It is of course the same between the right-hand motor and the generation unit located on the left.

Document EP 3 521 172 B1 discloses an electric propulsion system of an aircraft, comprising a first power reserve for supplying electrical power and a second power reserve to supply electrical power, and a plurality of electrical thruster units to provide driving power to the aircraft. A power distribution unit is provided to transmit the electrical power supplied from the first energy accumulator and the electrical power supplied from the second energy accumulator to at least one electric thruster unit. This power distribution unit is also configured to charge the second power reserve using a first part of the energy for at least one thruster unit and a second part of the energy to charge the second power reserve.

The backup circuits must thus be electrically decoupled from the electrical connections by the main buses in nominal operation, and must take over from a main bus in the event of a failure of an electrical unit. This implies that they have virtually the same characteristics as the main buses. In addition to the on-board weight of such backup circuits, which are not useful in a nominal manner, but only in the event of a fault, the control of these circuits requires actuators and effectors, which may also be sources of failures.

A purpose of the present disclosure is to overcome this drawback.

BRIEF SUMMARY

One aim of the present disclosure is notably to remedy all or part the aforementioned drawbacks.

According to a first aspect of the present disclosure, an electric propulsion system is proposed for an aircraft with stationary flight capabilities comprising:
  a plurality of electric power generators,
  a plurality of electrical buses, and
  a plurality of electric propulsion points.

In the propulsion system according to the present disclosure, at least one of the propulsion points of the plurality of propulsion points comprises a propellant bundle formed from a plurality of electric propeller thrusters.

A thruster within this propellant bundle is electrically connected by way of an electrical bus among the plurality of electrical buses to a generator within the plurality of electric power generators and at least one other thruster within this propellant bundle is electrically connected by way of another electrical bus among the plurality of electrical buses to another generator within the plurality of electric power generators.

In a preferred version of the present disclosure, each propulsion point comprises a propellant bundle formed of a plurality of electric-driven propeller-based thrusters and at each propulsion point, a thruster within the propellant bundle is electrically connected by way of an electrical bus among the plurality of electrical buses to a generator within the plurality of electric power generators and each other thruster within this propellant bundle is electrically connected by way of another electrical bus among the plurality of electrical buses to another generator within the plurality of electric power generators.

Thus, an electrical decoupling is proposed between a thruster connected to an electric power generator by way of an electrical bus and another thruster of the same propulsion point connected to another electric power generator by way of another electrical bus.

The decoupling makes it possible to:
  avoid the complexity of reconfiguring the network in-flight via dynamic reconnection switches, considering that high-voltage high-power switch technology is not sufficiently mature to be used in flight,
  avoid any possibility of defects spreading after the reconfiguration,
  provide increased native redundancy without reconfiguration,
  reduce development costs (the power per train is divided by two),
  easier validation (less complexity, since no reconfiguration),
  reduced power/current of electrical equipment.

According to one possibility, the electric power generators comprise turboalternators.

The electric power generators may be of the thermal type.

In one embodiment, the electric power generators comprise fuel cells.

According to one possibility, at least one propellant bundle is dedicated to cruising propulsion.

According to a second possibility, optionally in combination with the first, at least one propellant bundle is dedicated to producing a substantially vertical thrust.

According to a third possibility, optionally in combination with the first and/or second, at least one propellant bundle is dedicated to producing a vectored thrust.

According to a fourth possibility, optionally in combination with the first and/or second and/or third, at least one propellant bundle is dedicated to producing a lateral thrust.

According to a second embodiment of the present disclosure, a hover-capable aircraft is proposed that is equipped with a propulsion system according to the first embodiment, or one or more of its improvements.

According to a third aspect of the present disclosure, a method is proposed for managing an electrical propulsion system according to the first aspect of the present disclosure, or one or more of its improvements, equipping a hover-capable aircraft, the aircraft comprising a propulsion management module receiving thrust commands for a propulsion point issued by a flight control module, the management module being configured to send, on the one hand, power request instructions to each of the power generators and, on the other hand, thrust commands to each of the thrusters of the propulsion point.

Advantageously, the method further comprises a modification of the thrust commands sent to the thrusters of the propulsion point in the event that a failure of a power generation unit or of a thruster is detected.

BRIEF DESCRIPTION OF THE DRAWINGS

Other advantages and particularities of the present disclosure will become apparent on reading the detailed description of implementations and embodiments, which are in no way exhaustive, with reference to the accompanying drawings, in which.

DETAILED DESCRIPTION

Since the embodiments described below are in no way limiting, it will, in particular, be possible to consider variants of the present disclosure comprising only a selection of the features described, subsequently isolated from the other features described, if this selection of characteristics is sufficient to confer a technical advantage or to differentiate the present disclosure from the prior art. This selection comprises at least one feature, preferably functional, without structural details, or with only a portion of the structural details if this part only is sufficient to confer a technical advantage or to differentiate the present disclosure from the prior art.

In the figures, an element appearing in several figures retains the same reference.

Hover-Capable Aircraft

Aircraft are divided into two main classes as a function of the lift means used. Aerostats use a static force, while aerodynes generate a dynamic force in order to balance their weight; these aircraft are often designated as "lighter" or "heavier" than air.

The present disclosure relates to a hover-capable aircraft.

A balloon-based airship is an example of such an aircraft, and contains devices intended to provide its lift as well as propulsion systems giving it some maneuverability. To move, airships use a propulsion system.

An aerodyne, that is to say a "heavier than air" craft, the lift of which is mainly ensured by aerodynamic force, may also be a hover-capable aircraft.

This is, for example, the case when the lift of the aerodyne is provided by an electric motor with vectored thrust, which has the ability to shift, during a conversion phase, from a flight configuration in which the thrust is vertical to a flight configuration in which the thrust is horizontal.

This is also the case when the lift of the aerodyne is provided by a rotary wing.

Furthermore, some aerodynes have both a fixed wing and a rotary wing, and have the ability to shift, during a conversion phase, from a fixed-wing flight configuration to a rotary-wing flight configuration.

Thruster

A thruster according to the present disclosure is of the electric-motor-driven propeller type. The electric motor unit may of course comprise other elements, such as a geared motor.

In the present description, the term "thruster" refers, in particular, to propulsion devices of the static type having a horizontal and/or vertical component. The term "thruster" further refers to propulsion devices with vector thrust, for example, ones that orient the outlet flow by way of a steerable nozzle.

Figure 1:
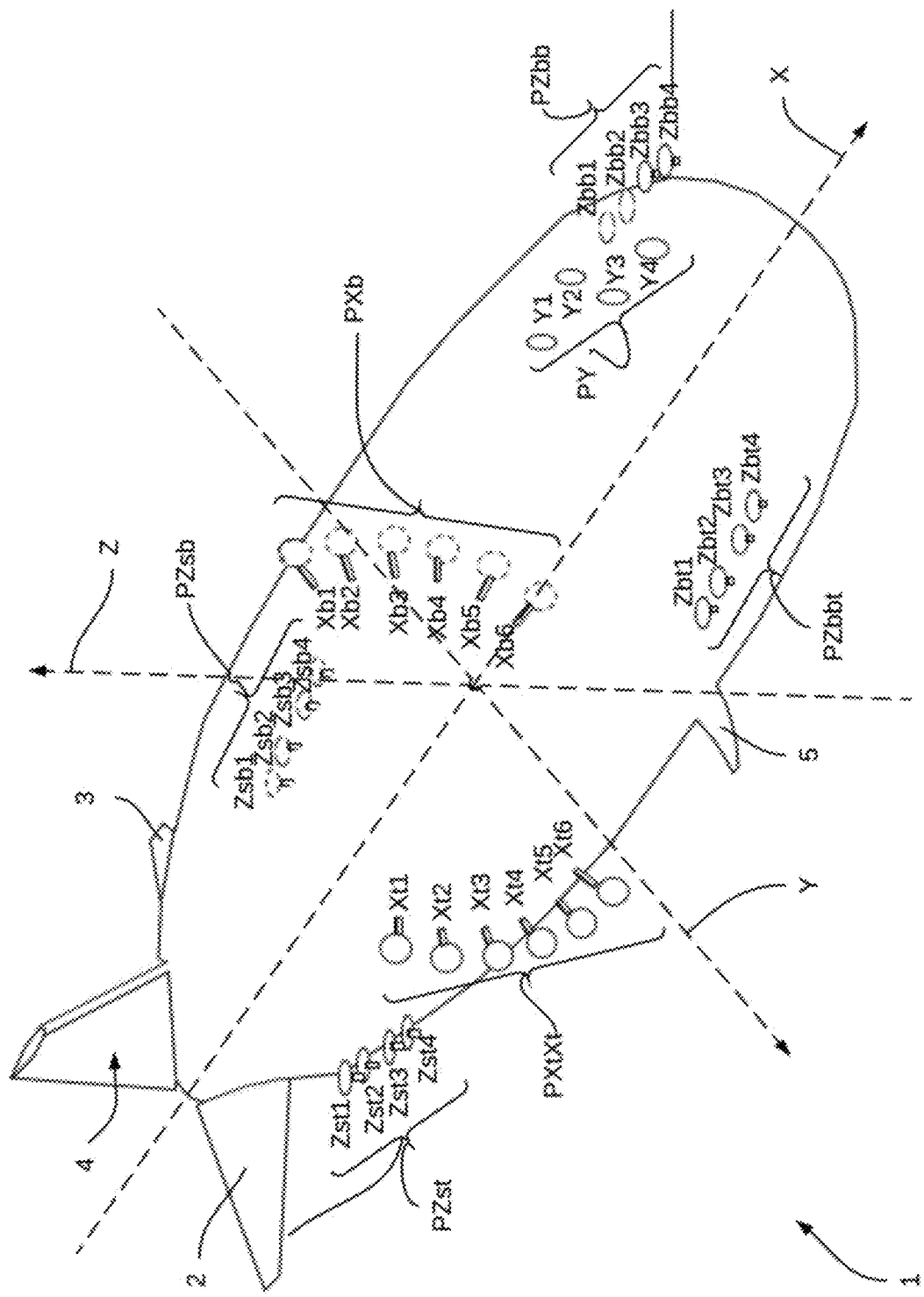
FIG. 1 schematically shows a perspective view of an airship according to the present disclosure, on the starboard and from its fore.

FIG. 1 shows an airship 1 having a roll axis in a longitudinal direction X, a pitch axis in a transverse direction Y, and a yaw axis in a vertical direction Z, perpendicular to the longitudinal direction and to the transverse direction.

The airship 1 comprises, at the aft, two stabilizers, respectively a starboard stabilizer 2 and a port stabilizer 3, provided with elevators and a tail fin 4 provided with the rudder.

The airship 1 further comprises two lateral ailerons, respectively a starboard aileron 5 and a port aileron 6 (FIG. 1).

The airship 1 is equipped with four electric power generators G1, G2, G3, G4. In the example shown, the power generators are of turboalternator type, also called turbogenerators. According to a variant, the power generators are electrically connected to fuel cells or/and to electric batteries. Also, in the example shown, each of the four generators have a power of 1 MW.

In the example shown, the four generators G1, G2, G3, G4 are located inside the lateral ailerons 5 and 6. More specifically, the turbogenerators G1 and G2 are located inside the starboard aileron 5 while the turbogenerators G3 and G4 are located inside the starboard aileron 6.

Also, in the example shown, the airship 1 is equipped with 7 propulsion points, respectively PXt, PXb, PY, PZbt, PZbb, PZst, PZsb that enable the hovering and movement of the craft.

The propulsion points PXt and PXb are arranged to generate a thrust in the longitudinal direction X toward the fore or aft. The propulsion points PXt and PXb are arranged on the starboard and on the port of the airship 1.

Even more precisely, each of the propulsion points PXt and PXb is a propellant bundle of 6 thrusters of the electric-motor-driven propeller type Xt1, Xt2, Xt3, Xt4, Xt5, Xt6, respectively Xb1, Xb2, Xb3, Xb4, Xb5, Xb6. The propellers of each of the thrusters of the propulsion points PXt and PXb are, for example, of the three-blade propeller type.

These propulsion points thus make it possible to generate an axial thrust forward or rearward or a yaw moment by differential thrust.

The propulsion point PY is arranged to generate a thrust in the transverse direction Y to starboard or port, to generate a moment along the yaw axis. In the example shown, the propulsion point PY is arranged at the fore of the airship 1, on the side of its upper part.

Even more precisely, the propulsion point PY is a propellant bundle of 4 thrusters of the electric-motor-driven propeller type Y1, Y2, Y3, Y4. The propellers of each of the thrusters of the propulsion point PY are, for example, of the three-blade propeller type.

The propulsion points PZbt and PZbb are arranged to generate a thrust in the downward or upward direction Z. The propulsion points PZbt and PZbb are arranged at the fore, starboard, and port of the airship 1.

Even more precisely, each of the propulsion points PZbt and PZbb is a propellant bundle of 4 thrusters of the electric-motor-driven propeller type Zbt1, Zbt2, Zbt3, Zbt4, respectively Zbb1, Zbb2 Zbb3, Zbb4. The propellers of each of the thrusters of the propulsion points Pzbt and PZbb are, for example, of the three-blade propeller type.

The propulsion points PZst and PZsb are arranged to generate a thrust in the downward or upward direction Z. The propulsion points PZst and PZsb are arranged at the aft, starboard, and port of the airship 1.

Even more precisely, each of the propulsion points PZst and PZsb is a propellant bundle of 4 thrusters of the electric-motor-driven propeller type Zst1, Zst2, Zst3, Zst4, respectively Zsb1, Zsb2 Zsb3, Zsb4. The propellers of each of the thrusters of the propulsion points Pzbt and PZbb are, for example, of the three-blade propeller type.

The propulsion points PZbt, PZbb, PZst and PZsb thus make it possible to generate a vertical thrust upward or downward, or a pitching moment by differential thrust between fore and aft, or a roll moment by differential thrust between starboard and port.

Figure 2:
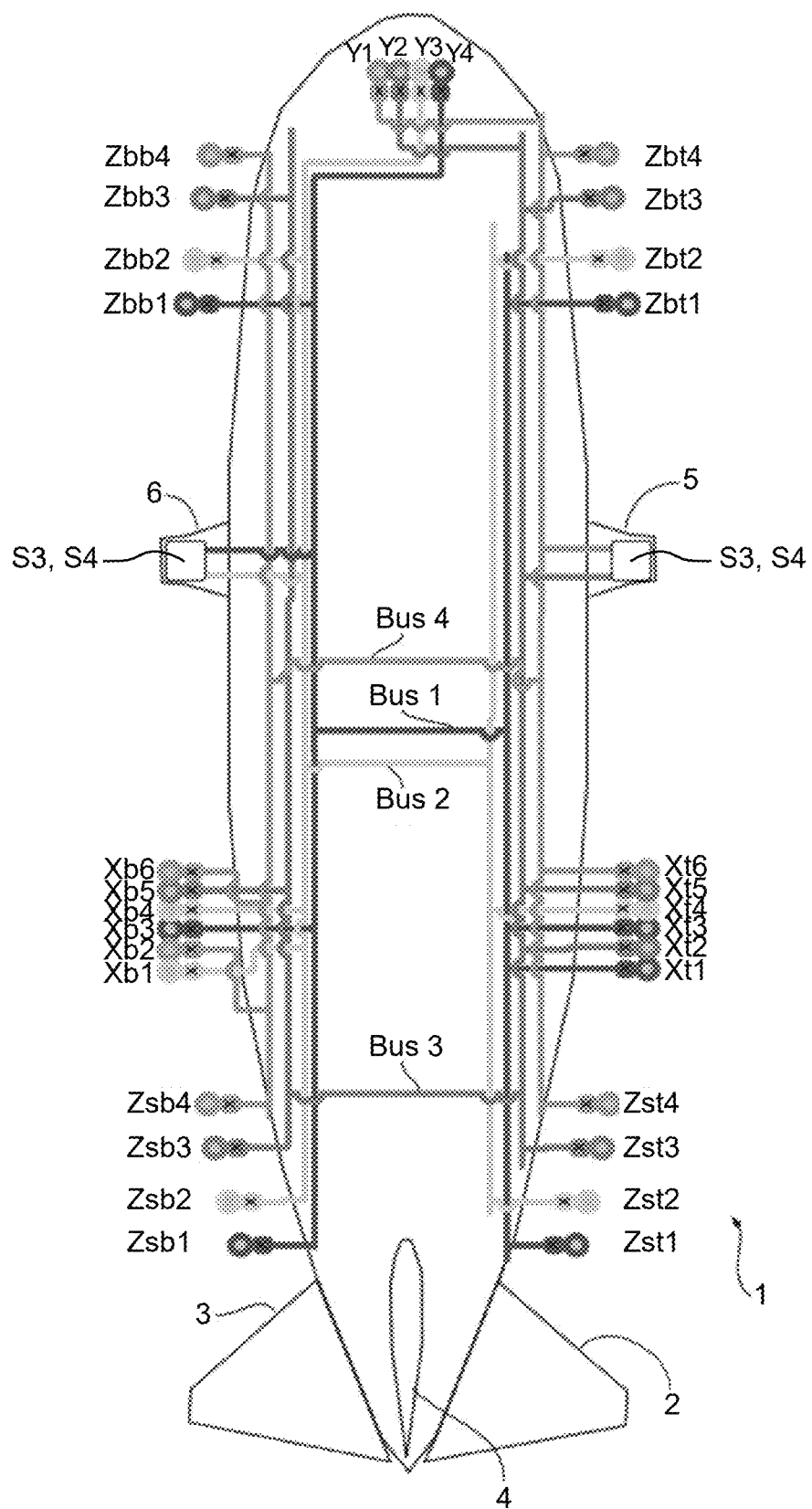
FIG. 2 schematically shows a top view of the airship shown in FIG. 1.

As shown in FIG. 2, the airship 1 is also equipped with 4 electrical buses with a power transport capacity of 1 MW, Bus 1, Bus 2, Bus 3, Bus 4.

Each of the electrical buses, respectively Bus 1, Bus 2, Bus 3, Bus 4, is connected to a turbine, respectively G1, G2, G3, G4, by way of systems S1, S2, S3, S4, which will be described below.

Bus 1 is connected to the electric motor Xt1, Xt3, Xb3, Y4, Zbt1, Zbb1, Zst1, Zsb1.

Bus 2 is connected to the electric motor Xt4, Xb1, Xb4, Y3, Zbt2, Zbb2, Zst2, Zsb2.

Bus 3 is connected to the electric motor Xt2, Xt5, Xb5, Y5, Zbt3, Zbb3, Zst3, Zsb3.

Bus 4 is connected to the electric motor Xt6, Xb2, Xb6, Y1, Zbt4, Zbb4, Zst4, Zsb4.

Figure 3:
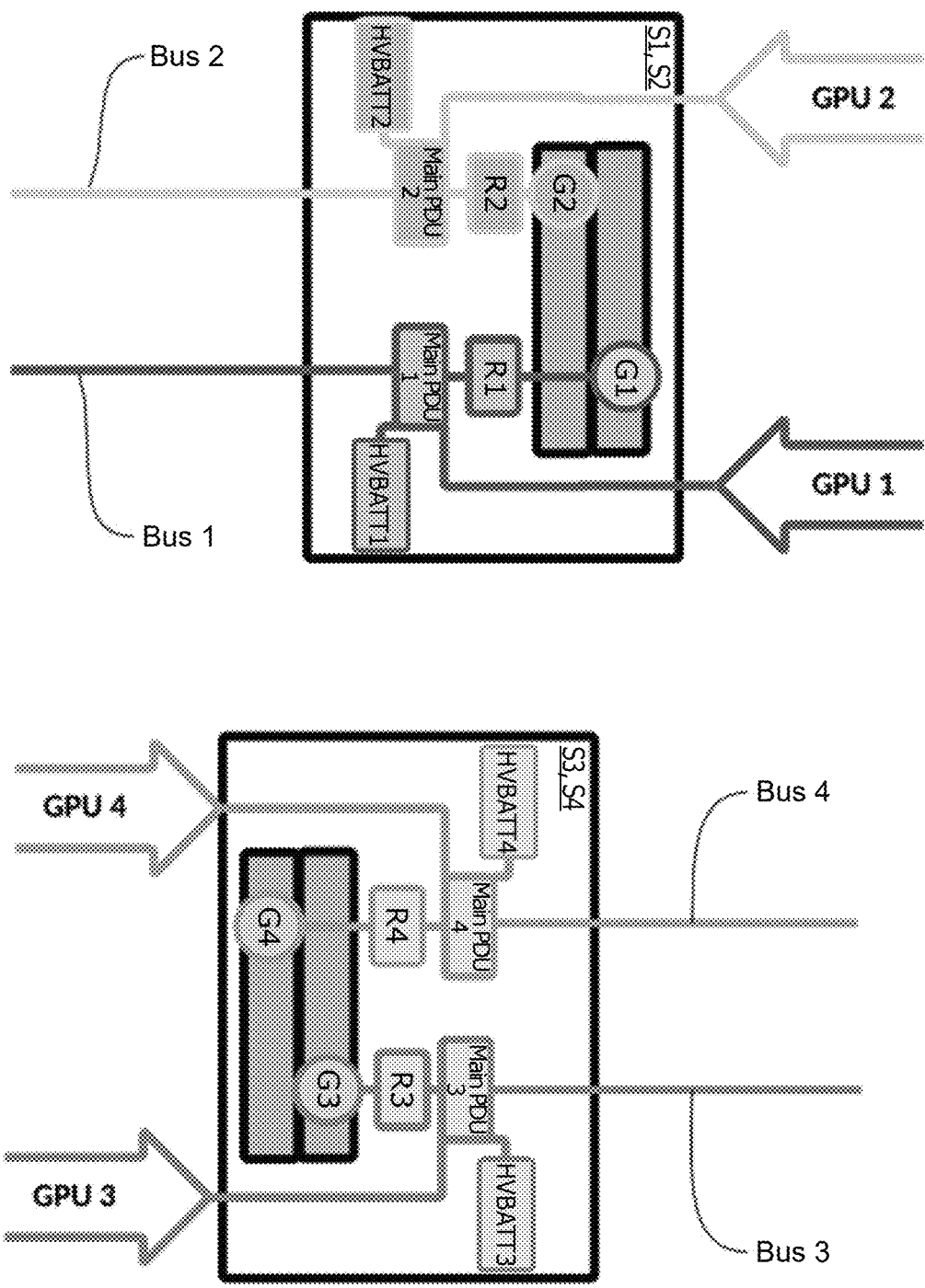
FIG. 3 schematically shows a detailed view of systems shown in FIG. 2.

The systems S1, S2, S3, S4 are now described with reference to FIG. 3.

The system S1 comprises:
a turbogenerator G1,
a rectifier device R1, connected to the turbogenerator G1,
a main power distribution unit Main PDU 1, connected to a bus Bus 1,
a battery HVBATT1, connected to the power distribution unit Main PDU 1.

The main power unit Main PDU1 is also connected to a ground power unit GPU1.

The system S2 comprises:
a turbogenerator G2,
a rectifier device R2, connected to the turbogenerator G2,
a main power distribution unit Main PDU 2, connected to a bus Bus 2,
a battery HVBATT2, connected to the power distribution unit Main PDU 2.

The main power unit Main PDU2 is also connected to a ground power unit GPU2.

The systems S1 and S2 are installed together in the port aileron 5.

The system S3 comprises:
a turbogenerator G3,
a rectifier device R3, connected to the turbogenerator G3,
a main power distribution unit Main PDU 3, connected to a bus Bus 3,
a battery HVBATT3, connected to the power distribution unit Main PDU 3.

The main power unit Main PDU3 is also connected to a ground power unit GPU3.

The system S4 comprises:
a turbogenerator G4,
a rectifier device R4, connected to the turbogenerator G4,
a main power distribution unit Main PDU 4, connected to a bus Bus 4,
a battery HVBATT4, connected to the power distribution unit Main PDU 4.

The main power unit Main PDU4 is also connected to a ground power unit GPU4.

The systems S3 and S4 are installed together in the starboard aileron 6.

Figure 4:
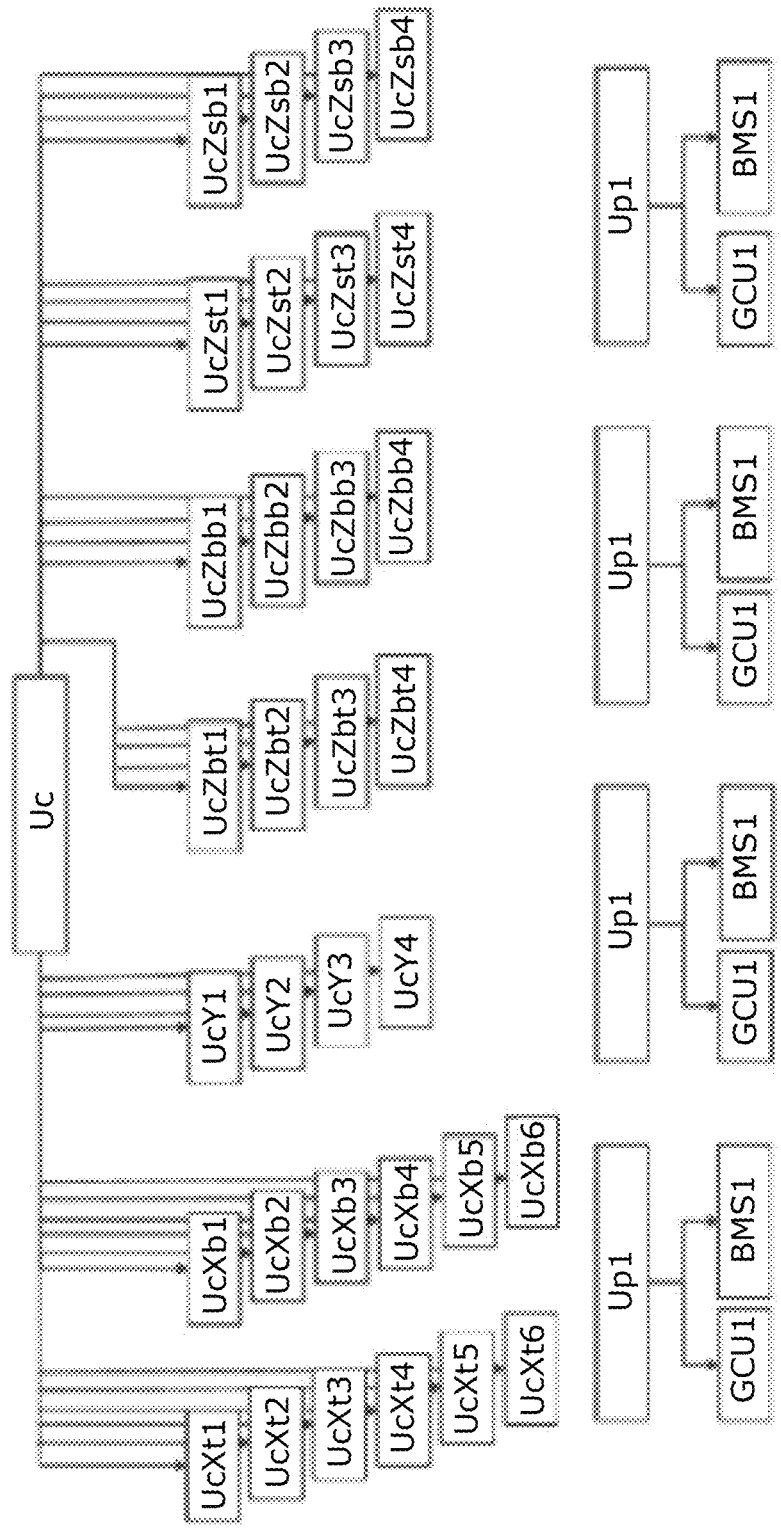
FIG. 4 schematically shows a connection scheme of systems shown in FIG. 2.

Thus, as shown in FIG. 4 the control of the flight of the airship 1 is ensured by a control unit Uc, which receives the commands from the pilot, processes them and transmits them to the set of electric motors.

The electric motors are individually equipped with a unit for controlling the propeller pitch, which makes it possible to manage the thrust delivered. Thus, the pilot's orders are transmitted:
to the electric motors Xt1, Xt2, Xt3, Xt4, Xt5, Xt6 of the propulsion point PXt, via the control units, respectively UcXt1, UcXt2, UcXt3, UcXt4, UcXt5, UcXt6,
to the electric motors Xb1, Xb2, Xb3, Xb4, Xb5, Xb6 of the propulsion point PXb, via the control units, respectively UcXb1, UcXb2, UcXb3, UcXb4, UcXb5, UcXb6,
to the electric motors Y1, Y2, Y3, Y4 of the propulsion point PY, via the control units, respectively UcY1, UcY2, UcY3, UcY4,
to the electric motors Zbt1, Zbt2, Zbt3, Zbt4 of the propulsion point PZbt, via the control units, respectively UcZbt1, UcZbt2, UcZbt3, UcZbt4,
to the electric motors Zbb1, Zbb2 Zbb3, Zbb4, of the propulsion point PZbb, via the control units, respectively UcZbb1, UcZbb2, UcZbb3, UcZbb4,
to the electric motors Zst1, Zst2, Zst3, Zst4 of the propulsion point PZst, via the control units, respectively UcZst1, UcZst2, UcZst3, UcZst4,
to the electric motors Zsb1, Zsb2, Zsb3, Zsb4 of the propulsion point PZsb, via the control units, respectively UcZsb1, UcZsb2, UcZsb3, UcZsb4.

The control unit Uc distributes the request from the pilot to all the electric motors. In the event of a malfunction, either of a propulsion chain, or an electric motor, it distributes this request to the remaining functional units.

Each propulsion chain is controlled by a control unit, respectively Up1, Up2, Up3, Up4.

Each turbogenerator is controlled by a generator control unit GCU1, GCU2, GCU3, GCU4, respectively for the generators G1, G2, G3, G4.

Each battery is controlled by a control unit BMS1, BMS2, BMS3, BMS4 (for "battery management system") respectively for the batteries HVBATT1, HVBATT2, HVBATT3, HVBATT4.

The control unit Up1 ensures the management of the electrical power available on Bus 1. Depending on the total power of the electric motors Xt1, Xt3, Xb3, Y4, Zbt1, Zbb1, Zst1, Zsb1 supplied by Bus 1, the unit Up1 controls the operating point of the turbogenerator G1, via the controller GCU1 and manages the charging or discharging of the battery HVBATT1 via the controller BMS1.

The control unit Up2 ensures the management of the electrical power available on Bus 2. Depending on the total power of the electric motors Xt4, Xb1, Xb4, Y3, Zbt2, Zbb2, Zst2, Zsb2 supplied by Bus 2, the unit Up2 controls the operating point of the turbogenerator G2, via the controller GCU2 and manages the charging or discharging of the battery HVBATT2 via the controller BMS2.

The control unit Up3 ensures the management of the electrical power available on Bus 3. Depending on the total power of the electric motors Xt2, Xt5, Xb5, Y5, Zbt3, Zbb3, Zst3, Zsb3 supplied by Bus 3, the unit Up3 controls the operating point of the turbogenerator G3, via the controller GCU3 and manages the charging or discharging of the battery HVBATT3 via the controller BMS3.

The control unit Up4 ensures the management of the electrical power available on Bus 4. Depending on the total power of the electric motors Xt6, Xb2, Xb6, Y1, Zbt4, Zbb4, Zst4, Zsb4 supplied by Bus 4, the unit Up4 controls the operating point of the turbogenerator G4, via the controller GCU4 and manages the charging or discharging of the battery HVBATT4 via the controller BMS4.

Thus, for each of the propulsion points, a thruster of the propulsion point is electrically connected by way of an electrical bus to one of the plurality of electric power generators and another thruster of the propulsion point is electrically connected by way of another electrical bus to another generator of the plurality of power generators.

It will be understood that when a turbogenerator stops operating, for each propulsion point that previously had a predetermined thrust, and when the propulsion point comprises 4 thrusters, each of the thrusters being supplied independently of the others by 1 turbo generator, the new thrust of the propulsion point is reduced only by a quarter of the preceding thrust. This loss of thrust may possibly be corrected by modifying the thrust of the other 3 thrusters of the propulsion point.

Thus, when one power generation unit is failing and another is operating normally, a control unit can generate instructions intended for thrusters connected to the power generation unit that is operating normally, and the thrusters can implement the instructions.

Likewise, if one thruster of a propulsion point stops operating, and when the propulsion point comprises 4 thrusters, each of the thrusters being supplied independently of the others by 1 turbo generator, the new thrust from the propulsion point is only reduced by one-quarter of the preceding thrust. This loss of thrust may possibly be corrected by modifying the thrust of the other 3 thrusters.

Thus, when one thruster of a propulsion point is failing and another thruster of the propulsion point is operating normally, a control unit can generate instructions intended for the thrusters of the normally operating propulsion point, and the thrusters can implement the instructions.

Of course, the present disclosure is not limited to the examples that have just been described and numerous modifications can be made to these examples without departing from the scope of the present disclosure. In addition, the different features, forms, variants and embodiments of the present disclosure may be associated with one another in various combinations insofar as they are not incompatible or exclusive of one another.

The invention claimed is:

1. A hover-capable airship, comprising an electric propulsion system comprising:
 a plurality of electric power generators;
 a plurality of electrical buses; and
 a plurality of electric propulsion points, the plurality of electric propulsion points comprising at least one propellant bundle formed of a plurality of electric-driven propeller-based thrusters dedicated to exert a longitudinal thrust, and at least one propellant bundle formed of a plurality of dedicated electric-driven propeller-based thrusters to exert a vertical thrust, at least one of the longitudinal or vertical propellant bundles being arranged so that each thruster within the propellant bundle is electrically connected by way of an electrical bus among the plurality of electrical buses to a generator within the plurality of electric power generators, and each other thruster within the propellant bundle being electrically connected by way of another electrical bus among the plurality of electrical buses to another generator within the plurality of electric power generators;
 wherein the plurality of propulsion points further comprising at least one propellant bundle dedicated to producing a lateral thrust, the propellant bundle being arranged so that one of its thrusters is electrically connected by way of an electrical bus among the plurality of electrical buses to a generator within the plurality of electric power generators, and each at least one other thruster within the propellant bundle is electrically connected by way of another electrical bus among the plurality of electrical buses to another generator within the plurality of electric power generators.

2. The airship of claim 1,
 wherein each propulsion point comprises a propellant bundle including a plurality of electric propeller thrusters; and
 at each propulsion point, a thruster within the propellant bundle is electrically connected by way of an electrical bus among the plurality of electrical buses to a generator within the plurality of electric power generators, and each other thruster within the propellant bundle is electrically connected by way of another electrical bus among the plurality of electrical buses to another generator within the plurality of electric power generators.

3. The airship of claim 2, wherein the electric power generators comprise turboalternators.

4. The airship of claim 3, wherein the electric power generators comprise fuel cells.

5. A method for managing an electrical propulsion system equipping a hover-capable aircraft according to claim 1, the airship comprising a propulsion management module receiving thrust commands from a propulsion point issued by a flight control module, the propulsion management module being configured to send power request instructions to each of the power generators and thrust commands to each of the thrusters of the propulsion point.

6. The method of claim 5, further comprising modifying the thrust commands sent to the thrusters of the propulsion point in the event that a failure of a power generation unit or of a thruster is detected.

7. The airship of claim 1, wherein the electric power generators comprise turboalternators.

8. The airship of claim 1, wherein the electric power generators comprise fuel cells.

\* \* \* \* \*